United States Patent
Esdaile et al.

(10) Patent No.: US 9,634,987 B2
(45) Date of Patent: Apr. 25, 2017

(54) OBTAINING A MAC ADDRESS FROM AN EXTERNAL SOURCE

(71) Applicant: Aruba Networks Inc., Sunnyvale, CA (US)

(72) Inventors: Cameron Esdaile, Sunnyvale, CA (US); Kiyo Kubo, Sunnyvale, CA (US); Nicholas Farina, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 441 days.

(21) Appl. No.: 14/170,541

(22) Filed: Jan. 31, 2014

(65) Prior Publication Data

US 2015/0081867 A1 Mar. 19, 2015

Related U.S. Application Data

(60) Provisional application No. 61/880,069, filed on Sep. 19, 2013.

(51) Int. Cl.
*G06F 15/173* (2006.01)
*H04L 29/12* (2006.01)

(52) U.S. Cl.
CPC ...... *H04L 61/6022* (2013.01); *H04L 61/1511* (2013.01)

(58) Field of Classification Search
CPC .......................... H04L 61/6022; H04L 61/1511
USPC ........................................................ 709/223
See application file for complete search history.

(56) References Cited

U.S. PATENT DOCUMENTS

| 7,055,173 | B1* | 5/2006 | Chaganty | H04L 41/0654 726/11 |
|---|---|---|---|---|
| 7,072,337 | B1* | 7/2006 | Arutyunov | H04L 12/2801 370/389 |
| 7,114,070 | B1* | 9/2006 | Willming | H04L 29/12273 380/30 |
| 9,087,183 | B2* | 7/2015 | Bartlett | G06F 21/31 |
| 9,332,054 | B2* | 5/2016 | Wilson | H04L 67/02 |
| 2005/0243845 | A1* | 11/2005 | Higashitaniguchi | H04L 12/437 370/404 |
| 2006/0034318 | A1* | 2/2006 | Fernandes | H04L 12/2854 370/463 |
| 2012/0173759 | A1* | 7/2012 | Agarwal | H04L 67/2814 709/241 |
| 2012/0258712 | A1* | 10/2012 | Rozinov | H04L 61/1535 455/435.1 |
| 2013/0007848 | A1* | 1/2013 | Chaskar | H04W 12/12 726/4 |
| 2015/0078402 | A1* | 3/2015 | Diener | H04L 61/609 370/475 |
| 2016/0212695 | A1* | 7/2016 | Lynch | H04W 48/08 |

* cited by examiner

*Primary Examiner* — Kevin Bates
*Assistant Examiner* — Ronak Patel
(74) *Attorney, Agent, or Firm* — Brooks, Cameron & Huebsch, PLLC

(57) ABSTRACT

A non-transitory computer readable medium storing instructions which, when executed on one or more processors, cause performance of operations. The operations include: receiving a first message from a device; determining, in response to the first message, a media access control (MAC) address of the device; and transmitting, in response to the first message, a second message comprising the MAC address to the device.

4 Claims, 6 Drawing Sheets

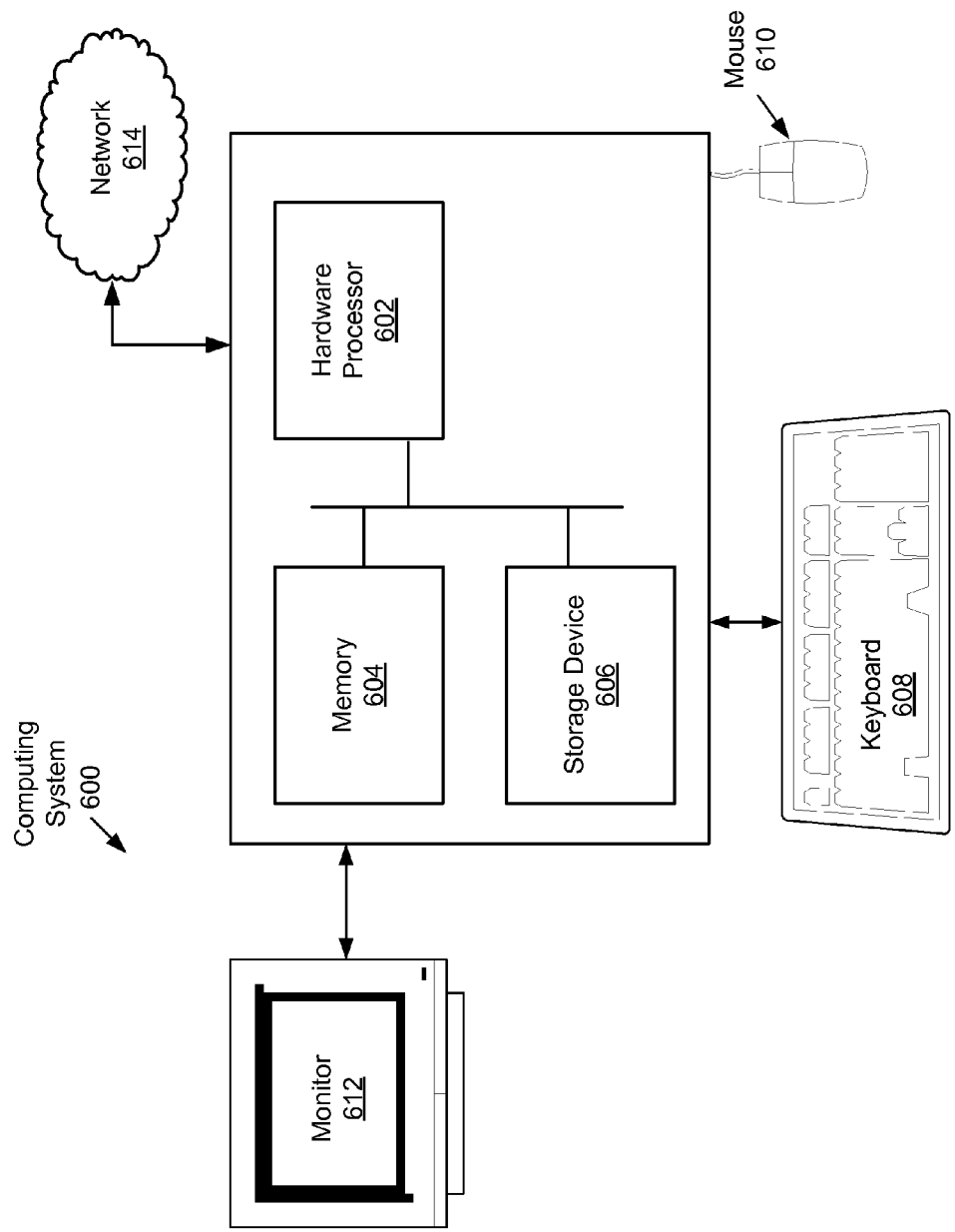

… (1)

OBTAINING A MAC ADDRESS FROM AN EXTERNAL SOURCE

CROSS-REFERENCE TO RELATES APPLICATIONS

This application is a non-provisional patent application of U.S. Provisional Patent Application Ser. No. 61/880,069, filed on Sep. 19, 2013, and entitled: "Obtaining a MAC Address from an External Source." Accordingly, this non-provisional patent application claims priority to U.S. Provisional Patent Application Ser. No. 61/880,069 under 35 U.S.C. §119(e). U.S. Provisional Patent Application Ser. No. 61/880,069 is hereby incorporated in its entirety.

BACKGROUND

A media access control (MAC) address is a unique identifier assigned to computing devices for communications on a network. MAC addresses are used as a network address for many network technologies, including Ethernet. Logically, MAC addresses are used in the media access control protocol sublayer of the Open Systems Interconnection (OSI) reference model. A user application executing on a computing device may utilize the MAC address of the computing device to perform one or more functions. Accordingly, if the user application is unable to access the MAC address of the computing device (e.g., the user application is being blocked or prevented from accessing the MAC address), functionality of the user application will be lost.

OVERVIEW

In general, in one aspect, embodiments relate to a non-transitory computer readable medium comprising instructions which, when executed on one or more processors, cause performance of operations. The operations comprise: receiving a first message from a device; determining, in response to the first message, a media access control (MAC) address of the device; and transmitting, in response to the first message, a second message comprising the MAC address to the device.

In general, in one aspect, embodiments relate to a non-transitory computer readable medium comprising instructions which, when executed on one or more processors, cause performance of operations. The operations comprise: transmitting, by an application executing on a first device, a first message to a second device, the application not having access to a Media Access Control (MAC) address of the first device; receiving, from the second device, a second message in response to the first message; and extracting, by the application, the MAC address of the first device from the second message.

In general, in one aspect, embodiments relate to a system. The system comprises: at least one processor; the system being configured to perform operations comprising: receiving a first message from a device; determining, in response to the first message, a media access control (MAC) address of the device; and transmitting, in response to the first message, a second message comprising the MAC address to the device.

In general, in one aspect, embodiments relate to a system. The system comprises: at least one processor; the system being configured to perform operations comprising: transmitting, by an application executing on a first device, a first message to a second device, the application not having access to a Media Access Control (MAC) address of the first device; receiving, from the second device, a second message in response to the first message; and extracting, by the application, the MAC address of the first device from the second message.

Other aspects will be apparent from the following description and the appended claims.

BRIEF DESCRIPTION OF DRAWINGS

FIG. 6 shows a computer system in accordance with one or more embodiments.

DETAILED DESCRIPTION

Figure 1:
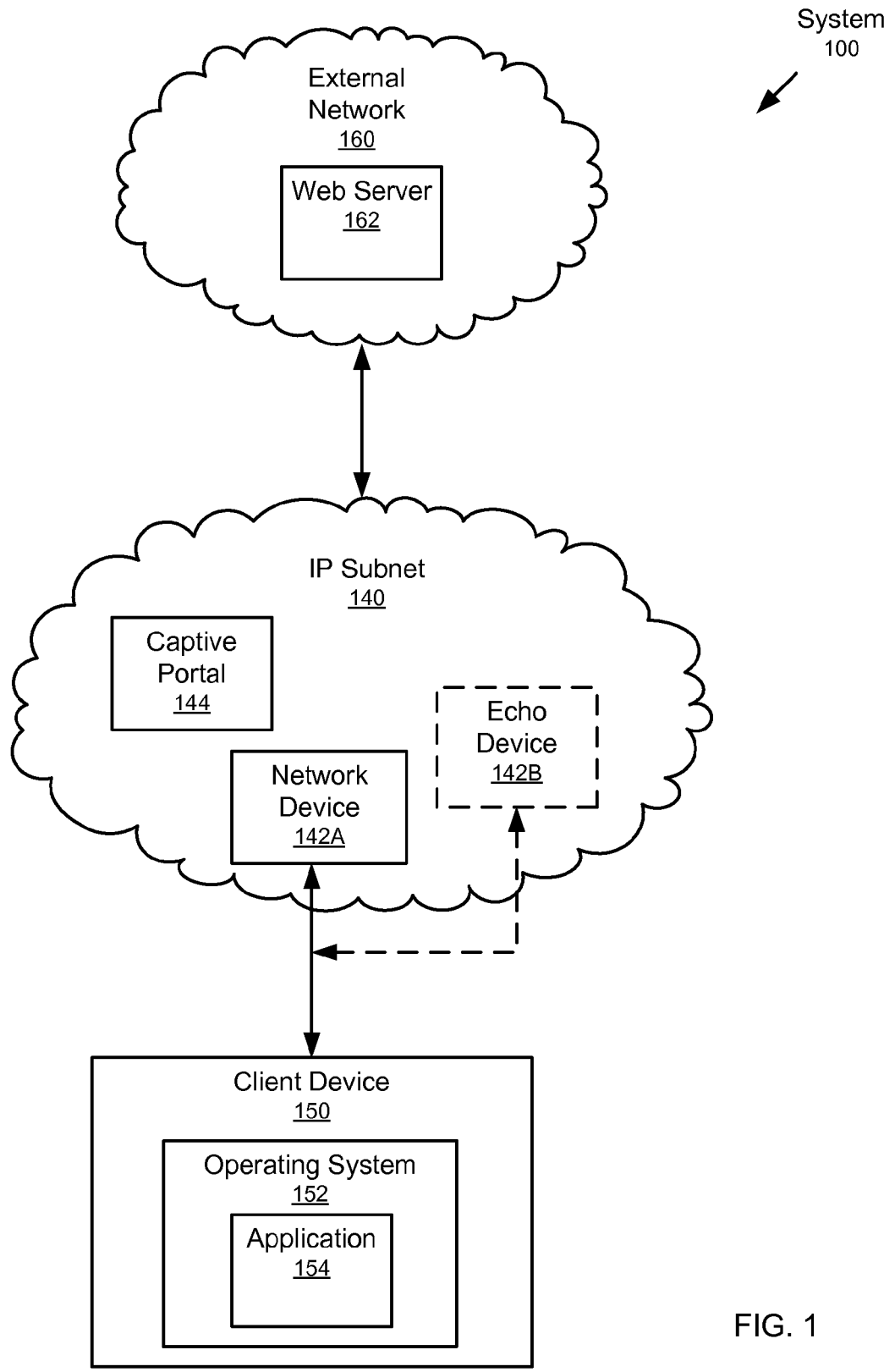
FIG. 1 shows a system in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the embodiments may be practiced without these specific details. In other instances, well-known features have not been described in detail to avoid unnecessarily complicating the description.

In general, embodiments provide a system, method, and non-transitory computer readable medium for providing an application executing on a computing device with the MAC address of the computing device. The MAC address is determined by an external source (e.g., network device, controller, access point, web server, etc.) and delivered to the application in a message. For example, the MAC address may be specified in the payload (i.e., not the header) of the message delivered to the application (discussed below). As yet another example, the MAC address may be specified in a redirect uniform resource locator (URL) to a captive portal (discussed below). Once the message has arrived, the application may extract the MAC address from the message and the full functionality of the user application may be realized.

FIG. 1 shows a system (100) in accordance with one or more embodiments. As shown in FIG. 1, the system (100) has multiple components including a client device (150), an internet protocol (IP) subnet (140), and an external network (160). The IP subnet (140) effectively connects the client device (150) to the external network (160). The external network (160) may be the Internet while the IP subnet (140) may be the local network of a corporate campus, an academic institution, a personal residence, a retail establishment, etc. The external network (160) and the IP subnet (140) may be of any size and include wired and/or wireless segments. Each of these components (140, 150, 160) is discussed below.

In one or more embodiments, the external network (160) includes a web server (162). The web server (162) is configured to receive requests for a web page. The web server (162) is also configured to serve (i.e., send) the web page to the requesting computing device (e.g., Client Device (150)). Both the request for the web page and the response including the web page may be referred to as messages. In one or more embodiments, the web server (162) is configured to determine the MAC address of the requesting computing device from the request. For example, the web server (162) may determine the MAC address of the computing device from the IP address of the requesting computing device specified in the request. In such embodiments, the web server (162) inserts the MAC address of the requesting computing device into the web page that is served.

In one or more embodiments, the IP subnet (140) includes a network device (142A). The network device (142A) may correspond to an access point, a controller, a gateway, a switch, a web server, or any combination thereof. In one or more embodiments, the network device (142A) is configured to receive a request from the client device (150) and respond to the request with a message having the MAC address of the client device (150). Both the request from the client device (150) and the response to the request may be referred to as messages. The network device (142A) may store the MAC addresses of all client devices (e.g., client device (150)) connected to the network device (142A). Additionally or alternatively, the network device (142A) may be configured to determine the MAC address of the client device (150) from/using the IP address of the client device (150) specified in the request.

For example, the request from the client device (150) may be a request for the web page being served by the web server (162). If the IP subnet (140) is a captive network, the message delivered by the network device (142A) in response to the request may include a URL redirect to the captive portal (144). The URL redirect specifies the MAC address of the client device (150). Those skilled in the art, having the benefit of this detailed description, will appreciate that the format of the URL redirect and thus the position of the MAC address within the URL redirect is highly dependent on the manufacturer of the network device (142A).

As another example, the request from the client device (150) may be a multicast Domain Name System (mDNS) request. The message delivered by the network device (142A) (i.e., unicast mDNS response) may include the IP address of the desired server (not shown) and the MAC address of the client device (150). In other words, both the IP address of the desired server (not shown) and the MAC address of the client device (150) are in the payload (i.e., not header) of the message being delivered to the client device (150) in response to the mDNS request.

As yet another example, the request from the client device (150) may be a custom request (i.e., custom message) for its MAC address. This custom request triggers the network device (142A) to respond with a message having the MAC address of the client device (150). The MAC address is specified within the payload (i.e. not the header) of the message delivered by the network device (142A).

In one or more embodiments, the IP subnet (140) includes an echo device (142B). Like the network device (142A), the echo device (142B) may correspond to an access point, a controller, a gateway, a switch, or any combination thereof. Further, like the network device (142A), the echo device (142B) may store the MAC addresses of all client devices (e.g., client device (150)) connected to the network device (142A) or any other network device (not shown) in the IP subnet (140). Additionally or alternatively, the echo device (142B) may be configured to determine the MAC address of the client device (150) from/using the IP address of the client device (150).

In one or more embodiments, the echo device (142B) receives, in parallel, all messages sent by the client device (150) to the network device (142A). As discussed above, the client device (150) may transmit a custom request (i.e., custom message) for its MAC address. The custom request may be recognized by the echo device (142B) but not by the network device (142A). For example, the echo device (142B) and the network device (142A) may be produced by different manufacturers and thus recognize different message sets. In such scenarios, the echo device (142B) may respond to the custom request with a message having the MAC address of the client device (150). In contrast, the network device (142A) may discard the custom request without responding, or respond to the custom request with an error message.

In one or more embodiments, the client device (150) executes a user application (154). The client device (150) may be a desktop personal computer (PC), a laptop, a tablet computer, a smart phone, etc. The user application (154) may utilize the MAC address of the client device (150) to perform one or more functions. In one or more embodiments, the user application (154) is indoor Global Positioning System (GPS) navigation software.

In one or more embodiments, the client device (150) executes an operating system (152). The operating system (152) does not provide the application (154) with access to the MAC address of the client device (150). In other words, the operating system (152) effectively blocks the application (154) from directly accessing the MAC address of the client device (150). As discussed above, if the user application (154) is unable to access the MAC address of the computing device (150), functionality of the user application (154) will be lost.

In one or more embodiments, the user application (154) is configured to obtain the MAC address of the client device (150) from an external source (e.g., web server (162), network device (142A), echo device (142B)) if the operating system (152) does not provide access to the MAC address. Specifically, the user application may transmit message(s) to an external source and then extract the MAC address of the client device (150) from the return message(s) from the external source.

For example, as discussed above, the user application (154) may transmit a request for a web page being served by the web server (162). If the IP subnet (140) is an open network, the response message to the request may include the web page from the web server (162) with the MAC address of the client device (150). The application (154) may then extract the MAC address from the web page. If the IP subnet (140) is a captive network, the response message to the request may include a redirect URL from the network device (142A). The redirect URL includes the MAC address of the client device (150). The user application (154) may first identify the manufacturer of the network device (142A) based on the format/pattern of the redirect URL, and then identify the location of the MAC address within the redirect URL based on the manufacturer.

As yet another example, as discussed above, the user application (154) may transmit a mDNS request or a custom request to the network device (142A) and/or the echo device (142B). The payload of the message received in response to the request includes the MAC address of client device (150). Even if the header of the message is stripped off by the client device (150) or the operating system (152), the MAC address is in the payload of the message and thus still accessible to the user application (154).

Although FIG. 1 shows a single client device connected to a single network device, those skilled in the art having the benefit of this detailed description, will appreciate that the IP subnet (140) may have any number of network devices, and there may be any number of client devices connected to each network device. Moreover, the echo device (142B) may receive all messages sent by any client device to any network device in the IP subnet (140).

Figure 2:
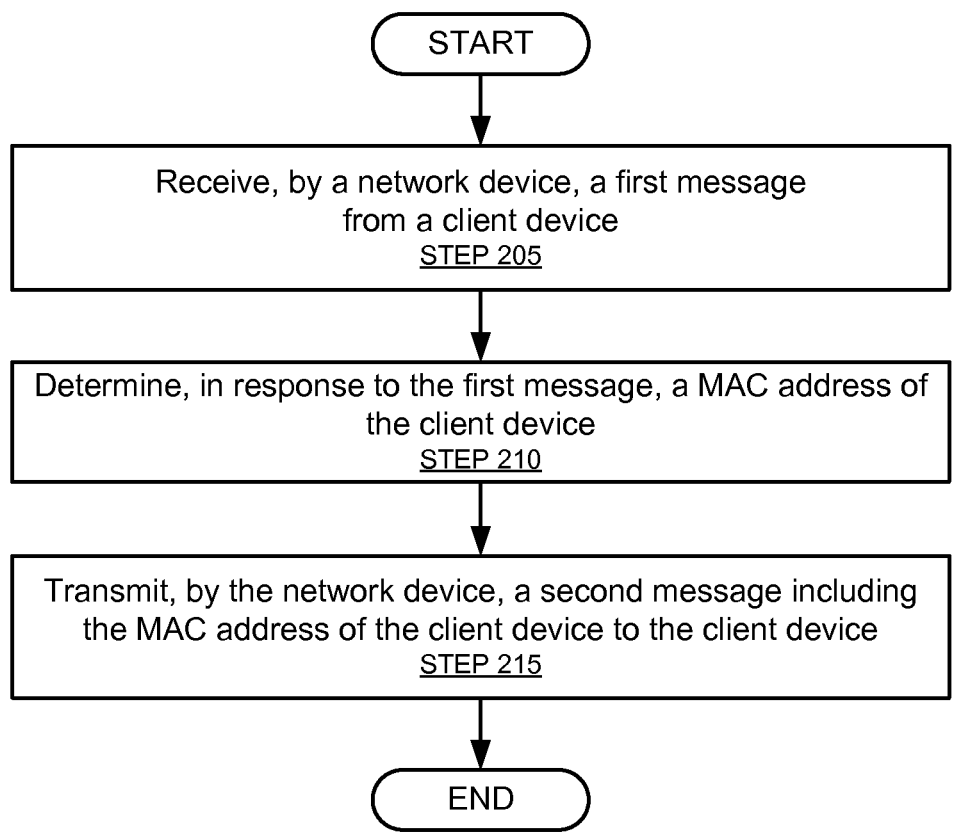
FIG. 2 shows a flowchart in accordance with one or more embodiments.

FIG. 2 shows a flowchart in accordance with one or more embodiments. The process shown in FIG. 2 may be executed, for example, by one or more components (e.g., client device (150), network device (142A), echo device (142B), web server (162)) discussed above in reference to FIG. 1. One or more steps shown in FIG. 2 may be omitted, repeated, and/or performed in a different order among different embodiments. Accordingly, embodiments should not be considered limited to the specific number and arrangement of steps shown in FIG. 2.

Initially, a first message is received from a client device (STEP 205). The first message is received by a network device. The first message may be a request for web page, an mDNS request, or a custom request for the MAC address of the client device. The network device may correspond to a web server, a controller, an echo device, etc. The network device may belong to an open or captive network. The first message may include/specify the IP address of the client device on the open or captive network.

In STEP 210, the MAC address of the client device is determined. The MAC address of the client device may be stored by the network device as a result of the client device connecting with (or roaming to) the network device. The MAC address may be determined from the IP address of the client device specified in the first message.

In STEP 215, a second message is sent to the client device. The second message is sent by the network device and includes the MAC address of the client device. For example, if the network device is a web server, the second message may include a web page with the MAC address of the client device. If the network device is a controller, access point, or controller and access point combination, the second message may be a URL redirect with the MAC address positioned within the URL redirect. The second message may be a unicast mDNS request response including, within the payload, the MAC address.

The client device may execute a user application that extracts the MAC address from the second message and utilizes the MAC address to perform one or more functions.

Figure 3:
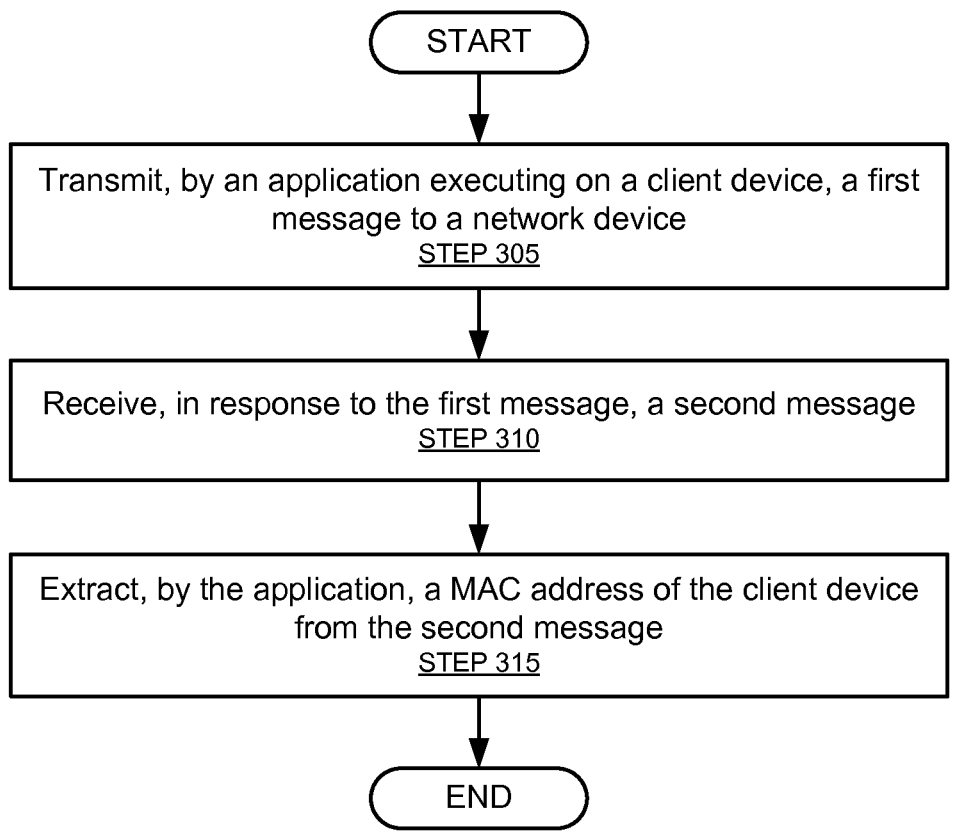
FIG. 3 shows a flowchart in accordance with one or more embodiments.

FIG. 3 shows a flowchart in accordance with one or more embodiments. The process shown in FIG. 3 may be executed, for example, by one or more components (e.g., client device (150), network device (142A), echo device (142B), web server (162)) discussed above in reference to FIG. 1. One or more steps shown in FIG. 3 may be omitted, repeated, and/or performed in a different order among different embodiments. Accordingly, embodiments should not be considered limited to the specific number and arrangement of steps shown in FIG. 3.

Initially, a first message is transmitted to a network device (STEP 305). Specifically, the first message is transmitted by an application executing on a client device. In one or more embodiments, the application requires the MAC address of the client device to perform one or more functions, and the operating system executing on the client device does provide the user application with access to the MAC address of the client device. Accordingly, the first message is transmitted by the application to obtain the MAC address of the client device from an external source (i.e., the network device). The network device may be a web server, a controller, an access point, a controller and access point combination, an echo device, etc. Moreover, the first message may be a request for a web page, a mDNS request, a custom request for the MAC address of the client device, etc.

In STEP 310, a second message is received in response to the first message. Specifically, the second message is received by the client device from the network device. As discussed above, the second message may comprise a web page, a URL redirect, a unicast mDNS request response, or a response to a custom request for the MAC address of the client device.

In STEP 315, the application extracts the MAC address of the client device from the second message. If the second message includes a web page, the MAC address may be extracted/scraped from the webpage. If the second message is a URL redirect from the network device, the application may first identify the manufacturer of the network device based on the format/style/pattern/content of the URL redirect, and then extract the MAC address from the position/location of the MAC address within the URL redirect specific to the manufacturer. If the second message is a unicast mDNS request response or a response to a custom request, the MAC address of the client device has been inserted in the payload of the second message by a network device or an echo device, and thus is extracted from the payload. The user application may then perform one or more functions that utilize/require the MAC address of the client device.

Figure 4:
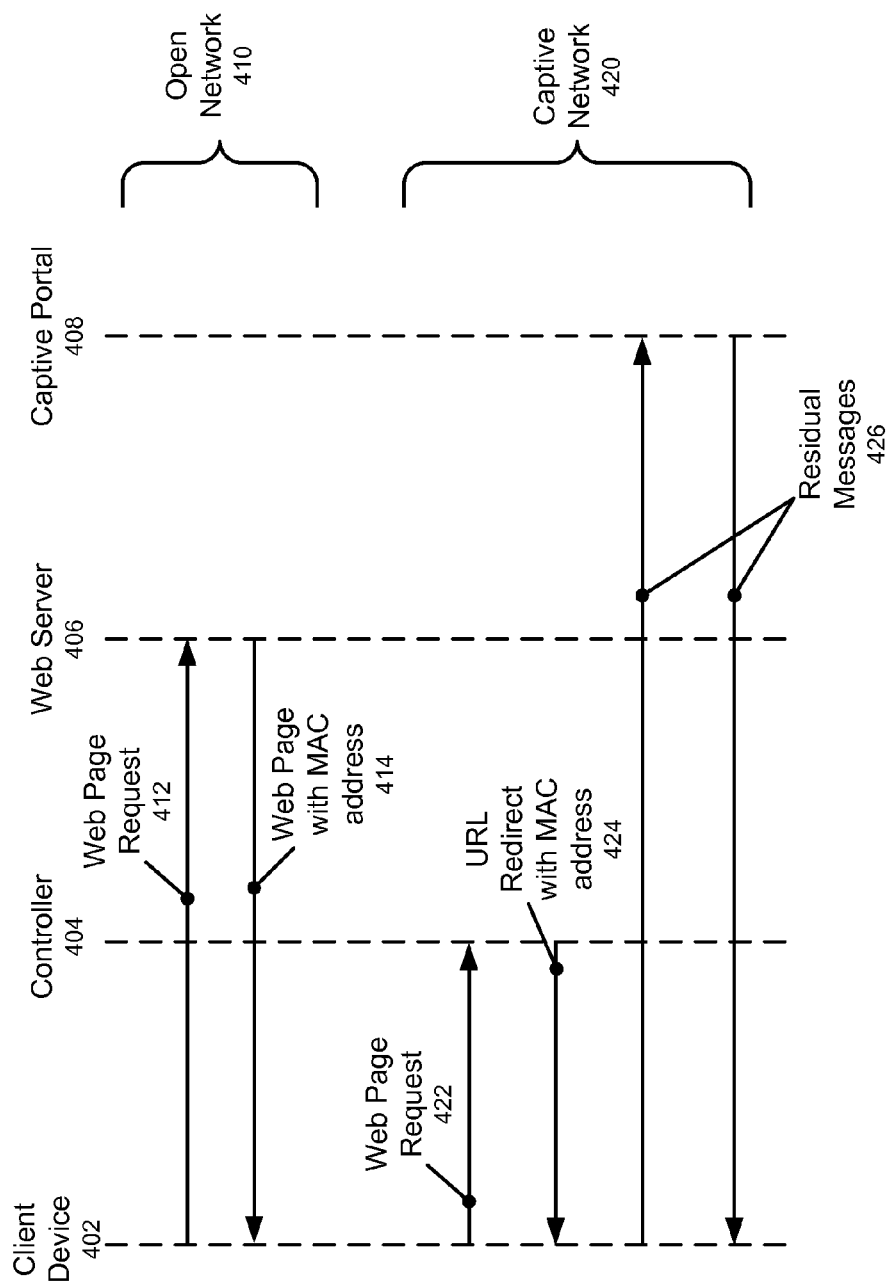
FIG. 4 shows an example(s) in accordance with one or more embodiments.

FIG. 4 shows examples in accordance with one or more embodiments. Specifically, FIG. 4 shows a timeline for a client device (402), a controller (404), a web server (406), and a captive portal (408) in both an open network (410) and a captive network (420). Assume in FIG. 4 that the client device (402) executes a user application requiring access to the MAC address of the client device (402), and that the operating system on the client device (402) does not provide the application with access to the MAC address (i.e., the MAC address of the client device (402) is not directly accessible to the application).

In the open network (410), the client device (402) issues a web page request (412). The web server (406) receives the web page request (412), determines the MAC address of the client device (i.e., from the IP address of the client device specified in the web page request (412)), and responds. The response (414) from the web server (406) includes the web page with the MAC address of the client device (402). Upon receiving the response (414), the user application executing on the client device (402) extracts/scrapes the MAC address from the webpage, and uses the MAC address to perform one or more functions.

In the captive network (420), the client device (402) issues a web page request (422). The controller (404) in the captive network (420) intercepts the web page request. Moreover, the controller (404) determines the MAC address of the client device (402) and issues a URL redirect with the MAC address (424). Those skilled in the art, having the benefit of this detailed description, will appreciate that the position of the MAC address within the URL redirect is highly dependent on the manufacturer of the controller (404). Upon receiving the URL redirect (424), the application executing on the client device (402) identifies the position of the MAC address in the URL redirect by identifying the manufacturer of the controller, and then extracts the MAC address from the position. The application may then use the MAC address to perform one or more functions. The URL redirect (424) redirects the client device to the captive network (420). The client device (402) may then exchange optional residual messages (426) with the captive portal. In one or more embodiments, the residual messages (426) are omitted as the application executing on the client device (402) now has the desired MAC address of the client device (402).

Figure 5:
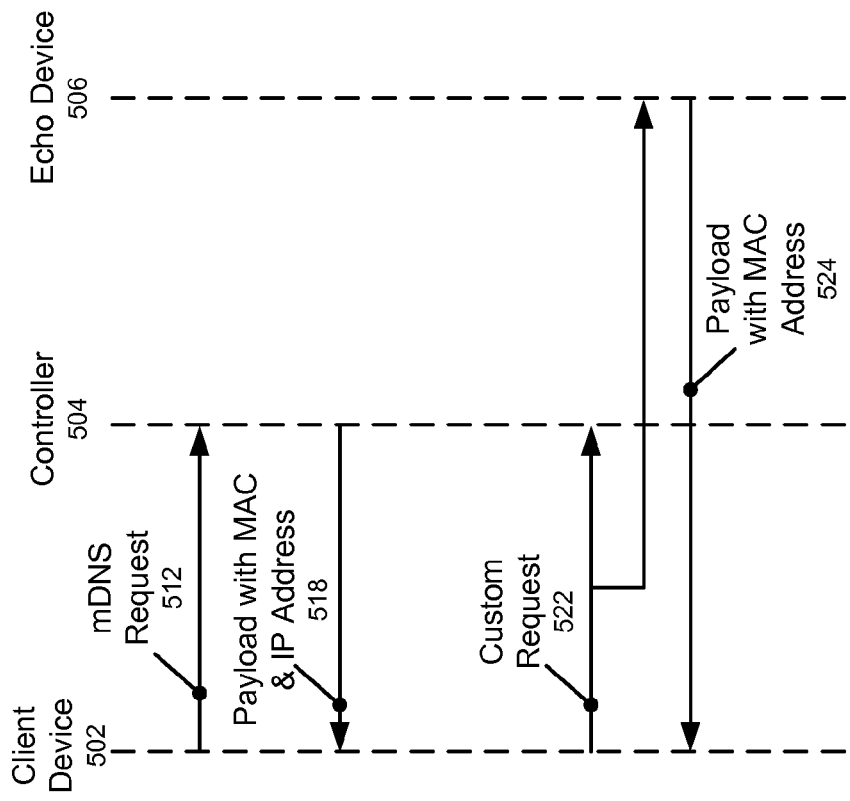
FIG. 5 shows an example(s) in accordance with one or more embodiments.

FIG. 5 shows examples in accordance with one or more embodiments. Specifically, FIG. 5 shows a timeline for a client device (502), a controller (504), and an echo device (506). Assume in FIG. 5 that the client device (502) executes a user application requiring access to the MAC address of the client device (502), and that the operating system on the client device (502) does not provide the application with access to the MAC address (i.e., the MAC address of the client device (502) is not directly accessible to the application).

In one example, the application executing on the client device (502) issues a mDNS request (512). The mDNS request (512) is a request for the IP address of a server having a desired service. The mDNS request (512) is received by the controller (504). The controller issues a response (518) to the mDNS request (512) with the IP address of the server and the MAC address of the client device. In one or more embodiments, the controller (504) determines the MAC address of the client device (502) and inserts the MAC address of the client device (502) into the payload of a unicast mDNS request response having the IP address of the server. Upon receiving the response (518), the user application executing on the client device (502) extracts the MAC address from the payload, and uses the MAC address to perform one or more functions.

In another example, the application executing on the client device (502) issues a custom request (522) for the MAC address of the client device (502). Both the controller (504) and the echo device (506) receive the custom request (522) in parallel. Assume the controller (504) and the echo device (506) are produced by different manufacturers and thus recognize different request sets. In this example, the controller (504) does not recognize the custom request (522) and simply discards the custom request (522). In contrast, the echo device (506) recognizes the custom request (522) and issues a response (524) to the custom request (522). Specifically, the echo device (506) generates a payload of the response (524) with the MAC address of the client device (502). Upon receiving the response (524), the user application executing on the client device (502) extracts the MAC address from the payload, and uses the MAC address to perform one or more functions.

Embodiments may have one or more of the following advantages: the ability of a user application to obtain the MAC address of a client device when the operating system of the client device does not provide access to the MAC address; the ability to utilize an echo device that has a different manufacturer than other network devices in the network; the ability to extract the MAC address of the client device from a URL redirect; the ability to insert the MAC address of the client device in the payload of a message and thus deliver the MAC address to the user application even if the header of the message is stripped off by the client device or operating system; etc.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s), such as a touchscreen, keyboard (608), mouse (610), microphone, touchpad, electronic pen, or any other type of input device. Further, the computing system (600) may include one or more output device(s), such as a screen (e.g., a liquid crystal display (LCD), a plasma display, touchscreen, cathode ray tube (CRT) monitor (612), projector, or other display device), a printer, external storage, or any other output device. One or more of the output device(s) may be the same or different from the input device(s). The computing system (600) may be connected to a network (614) (e.g., a local area network (LAN), a wide area network (WAN) such as the Internet, mobile network, or any other type of network) via a network interface connection (not shown). The input and output device(s) may be locally or remotely (e.g., via the network (614)) connected to the computer processor(s) (602), memory (604), and storage device(s) (606). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (600) may be located at a remote location and connected to the other elements over a network (614). Further, embodiments may be implemented on a distributed system having a plurality of nodes, where each portion of an embodiment may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions which, when executed by a processor, causes the processor to:

transmit a first message from a client device to a network device and an echo device, wherein the network device responds to a first format of message and the echo device response to a second format of message;

determine a format of the first message transmitted by the client device to the network device and the echo device;

based on the determined format of message transmitted by the client device, determine at the network device or the echo device, a media access control (MAC) address of the client device, wherein the MAC address is determined in response to the first message; and receive, at the client device, a second message including the MAC address of the client device, wherein the second message is transmitted in response to the first message;

the first message is generated by an application executing on the client device;

the application is blocked from accessing the MAC address of the client device when generating the first message; and the application accesses the MAC address of the client device from the second message.

2. A non-transitory computer readable medium comprising instructions which, when executed by a processor, causes the processor to:

transmit, by an application executing on a client device, a first message to a network device and an echo device, wherein: the network device responds to a first message format and the echo device responds to a second message format and the application is blocked from accessing a media access control (MAC) address of the client device;

determine a format of the first message transmitted by the client device to the network device and the echo device;

based on the determined format of the first message transmitted by the client device, receive a second message in response to the first message from the network device or the echo device, wherein the second message includes the MAC address of the client device; and extract, by the application, the MAC address of the client device from the second message;

the client device executes an operating system; and the operating system blocks the application from obtaining the MAC address of the client device directly from the client device.

3. A system comprising:

a processor;

a non-transitory computer readable medium comprising instructions executable by the processor to:

transmit a first message from a client device to a network device and an echo device, wherein the network device responds to a first message format and the echo device responds to a second message format;

determine a format of the first message transmitted by the client device to the network device and the echo device:

determine, in response to the first message and based on the determined format of the first message transmitted by the client device, a media access control (MAC) address of the client device; and receive, at the client device, a second message including the MAC address of the client device, wherein the second message is transmitted in response to the first message;

the first message is generated by an application executing on the client device, the application is blocked from accessing the MAC address of the client device when generating the first message; and the application accesses the MAC address of the client device from the second message.

4. A system comprising:

a processor;

a non-transitory computer readable medium comprising instructions executable by the processor to:

transmit, by an application executing on a client device, a first message to a network device and an echo device, wherein:

the network device responds to a first message format and the echo device responds to a second message format and the application is blocked from accessing a media access control (MAC) address of the client device;

determine a format of the first message transmitted by the client device to the network device and the echo device based on the determined format of the first message transmitted by the client device, receive, from the network device or the echo device, a second message in response to the first message, wherein the second message includes the MAC address of the client device; and extract, by the application, the MAC address of the client device from the second message;

the client device executes an operating system; and the operating system blocks the application from obtaining the MAC address of the client device directly from the client device.

* * * * *